(12) United States Patent  
McCrary

(10) Patent No.: US 8,430,595 B2  
(45) Date of Patent: Apr. 30, 2013

(54) LOW FRICTION SAFETY SYSTEM FOR A PERSONAL VEHICLE GUIDEWAY

(75) Inventor: Homer T McCrary, Davenport, CA (US)

(73) Assignee: McCrary Personal Transport System, LLC, Davenport, CA (US)

( * ) Notice: Subject to any disclaimer, the term of this patent is extended or adjusted under 35 U.S.C. 154(b) by 156 days.

(21) Appl. No.: 11/747,436

(22) Filed: May 11, 2007

(65) Prior Publication Data

US 2008/0118306 A1    May 22, 2008

Related U.S. Application Data

(63) Continuation-in-part of application No. 11/560,981, filed on Nov. 17, 2006.

(51) Int. Cl.  
*E01C 11/22* (2006.01)

(52) U.S. Cl.  
USPC .................................. 404/1; 404/7; 404/8

(58) Field of Classification Search .................. 404/1, 6, 404/7, 8  
See application file for complete search history.

(56) References Cited

U.S. PATENT DOCUMENTS

| | | | | | |
|---|---|---|---|---|---|
| 427,836 | A | * | 5/1890 | Clarke | 104/124 |
| 1,909,551 | A | * | 5/1933 | Ross | 404/8 |
| 1,927,189 | A | * | 9/1933 | Sory | 404/8 |
| 3,540,068 | A | * | 11/1970 | Bouthors | 14/74.5 |
| 3,807,699 | A | * | 4/1974 | France | 256/13.1 |
| 4,142,468 | A | * | 3/1979 | Birnstiel | 104/124 |
| 4,307,973 | A | * | 12/1981 | Glaesener | 404/6 |
| 4,376,594 | A | * | 3/1983 | Prosenz | 404/6 |
| 4,435,106 | A | * | 3/1984 | Forster et al. | 404/6 |
| 4,982,931 | A | * | 1/1991 | Pomero | 256/13.1 |
| 5,471,811 | A | * | 12/1995 | House et al. | 52/745.1 |
| 5,639,179 | A | * | 6/1997 | Jensen | 404/6 |
| 6,533,250 | B2 | * | 3/2003 | Arthur | 256/13.1 |
| 6,561,492 | B1 | * | 5/2003 | Hubbell | 256/13.1 |
| 6,684,793 | B2 | * | 2/2004 | Dutoit | 104/124 |

* cited by examiner

*Primary Examiner* — Gary S Hartmann  
(74) *Attorney, Agent, or Firm* — Donald R. Boys; Central Coast Patent Agency, Inc.

(57) ABSTRACT

In a vehicle guideway having a vehicle track, a guidance system is provided comprising one or more guide curbs installed along a length of the guideway, and a low-friction coating or coatings presented by the curbs, a vehicle's tires, or both, the coating or coatings reducing friction and wear in the event of contact between the tires and the one or more guide curbs.

1 Claim, 3 Drawing Sheets

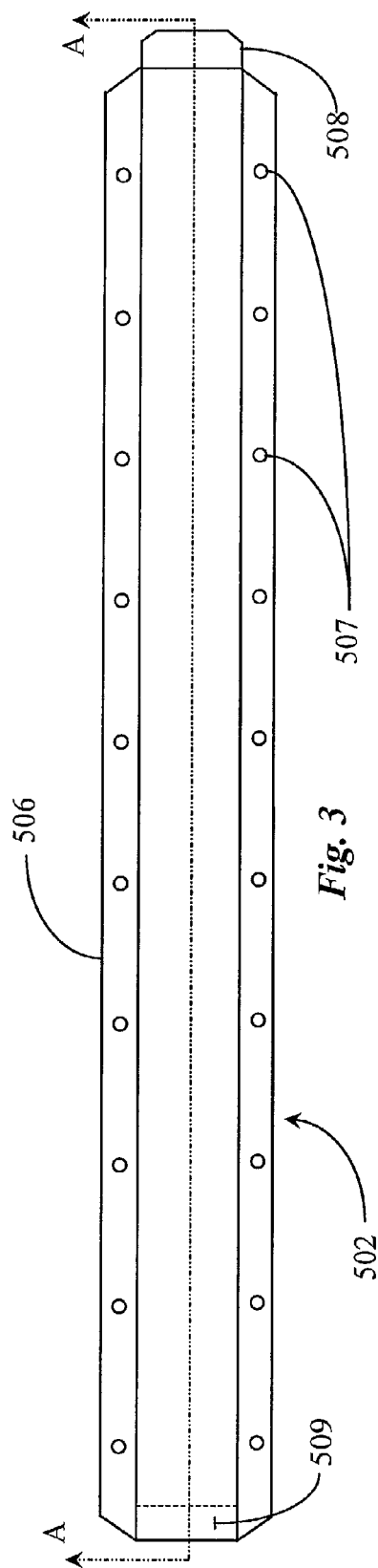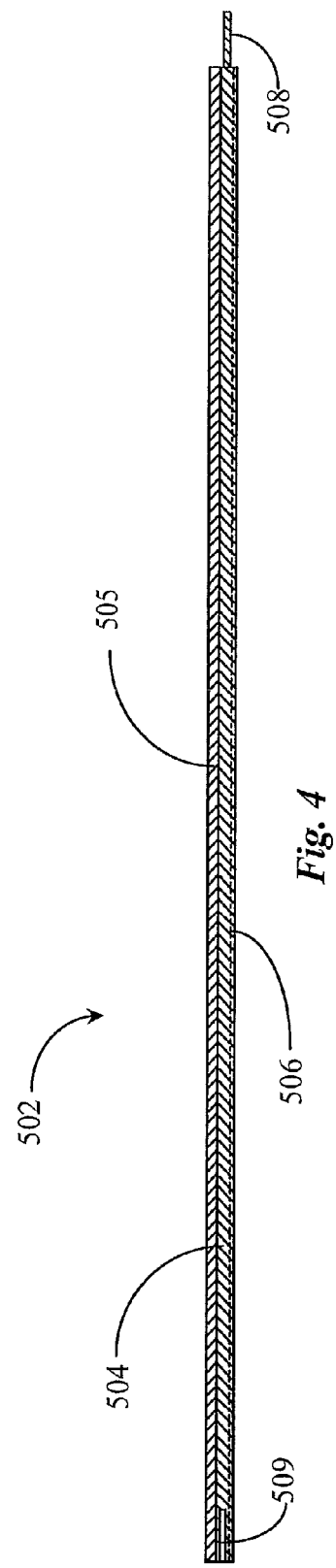

LOW FRICTION SAFETY SYSTEM FOR A PERSONAL VEHICLE GUIDEWAY

CROSS-REFERENCE TO RELATED APPLICATIONS

The present invention is a continuation-in-part (CIP) to a U.S. patent application Ser. No. 11/560,981, filed on Nov. 17, 2006 entitled: INTELLIGENT PUBLIC TRANSIT SYSTEM USING DUAL MODE VEHICLES. All of the disclosure of the prior application is incorporated herein at least by reference.

BACKGROUND OF THE INVENTION

1. Field of the Invention

The present invention is in the field of mass transit and pertains particularly to methods and apparatus for low friction safety in case of personal vehicle contact with a guideway side curb.

2. Discussion of the State of the Art

In the field of mass transit there are a variety of proposed mass transit system architectures, some developed and some not yet realized. Several such systems are described with reference to the co-pending application listed in the cross-reference section of this specification.

The inventor is aware of a computerized system for guiding activity in a current construction project is provided, comprising digital memory storing information about completed and current construction projects, at least one input mechanism for a user to provide information to the digital memory concerning the current construction project, a processor system for accessing information in the digital memory, processing said information, and providing output available to a user of the computerized system, and software guiding the processor in its accessing information, processing the information, and in providing the output. Considering a current project, the software accesses information regarding one or more completed projects as well as information concerning the current project, processes the information, and provides output specifying one or more actions to be taken in the current project.

In the system known to the inventor, in one aspect, the projects concern building computer-managed personal transport systems, wherein wheeled vehicles are guided in dedicated guideways by a computerized guidance system. In this aspect the inventor is aware of a personal transport system that includes a master computer, a controlled guideway comprising travel lanes and entrance and exit ramps, and dual-mode wheeled vehicles each having an on-board computer coupled to the master computer system, the dual-mode vehicles capable of accessing the guideway via the entrance ramps, travel on the guideway, exiting the guideway via the exit ramps, and of being driven on surface streets. At individual entrance ramps, dual mode vehicles attempting to access an entrance ramp are evaluated by equipment coupled to the master computer for suitability to travel on the controlled guideway, and vehicles failing one or more tests may be prevented from accessing the controlled guideway.

In the system described above and in more detail in the referenced co-pending application, personal vehicles (PVs) travel on specially constructed guideways having a vehicle transit lane bordered by guide curbs. In one aspect, the vehicles drive on special vehicle tracks and the distance between the guideway curbs is constraining such that the vehicle having a specific width dimension from edge of one tire on one vehicle side to the outside edge of the opposing tire must stay on the vehicle tracks.

In the co-pending specification, it is described that in some preferred embodiments the tires for PVs are constructed to have a special low-friction sidewall material such as Teflon™ or other low friction material to reduce friction between the tires and side curbs and guide surfaces as much as possible. Also in some cases the side curb surfaces may also be constructed to have low-friction material for the same reasons, and in some embodiments the tires are other than inflatable, to reduce the hazard of flat tires on the personal transit system (PTS) guideway. It has occurred to the inventor that there are a variety of materials and methods for implementing a system to protect vehicle tires and guideway curbs from frictional heat development and wear in case of contact between a personal vehicle's tires and a guideway curb.

Therefore, what is clearly needed in a personal transit system where PVs travel on dedicated guideways defined by guideway curbs is a system for protecting the vehicle tires and the guideway curbs from wear and abrasions and for reducing or eliminating any heat generated from occasional contact between tires and curbs.

SUMMARY OF THE INVENTION

In a vehicle guideway having a vehicle track, a guidance system comprising one or more guide curbs installed along a length of the guideway, and a low-friction coating or component presented by the curbs, a vehicle's tires or wheels, or both, the coating or components reducing friction and wear in the event of contact between the tires or wheels and the one or more guide curbs.

In one embodiment the guide curbs, positioned end-to-end, present a continuous guide to the tires of the vehicle. Also in one embodiment one of the low-friction coatings or components may comprise Teflon™. In another embodiment one of the low-friction coatings or components may comprise a Teflon-ceramic hybrid. In still another embodiment one of the low-friction coatings or components may comprise a ceramic-metallic hybrid. In some cases a low friction coatings is sprayed on.

In some embodiments one of the low-friction coatings or components is presented by a sidewall of one of the tires of a vehicle. Also in some embodiments the low-friction coating or component may be contiguous with the tire. The low-friction coating or component also may comprise Teflon™. In some cases the low-friction coating or component may comprise a Teflon-ceramic hybrid, or in other cases a ceramic-metal hybrid. Further the sidewall may be separate and installable to the wheel or tire.

In some cases the low-friction coating is sprayed on a tire of the vehicle. In some other cases the low-friction coating may be sprayed on one or more tires of the vehicle at a station at an entrance to the guideway. In some embodiments a time period since a last application of a spray-on coating may be ascertained for the vehicle, and the spray-on coating may be applied only if the time period exceeds a pre-programmed time period.

In some case the low-friction component may be a material molded into the sidewall of the tire. Also in some cases the low-friction component may be a rod or stud.

In another aspect of the invention a curb modularly installable to a vehicle guideway is provided, comprising an elongate flexible body and a low-friction coating applied to one surface of the body. In this embodiment multiple curbs installed end-to-end form a continuous guideway system constraining tires of vehicles traveling on the guideway.

In one embodiment of the curb the body may be one of metal, fiberglass, or polymer, and the coating may be Teflon-based. In another embodiment the coating may comprise a Teflon-ceramic hybrid. In yet another, the coating may comprise a ceramic-metal hybrid. In yet another embodiment the curb may further comprise opposing elongate flanges adapted for installing the curbs to the guideway.

In other embodiment of the curb there may be a tongue and groove at opposing ends to facilitate smooth surface mating from one curb to another in a multiple-curb system. There may also be an expansion joint.

In yet another aspect of the invention a wheel for a personal vehicle adapted for travel on a guideway having guideway curbs is provided, comprising a wheel body, a wheel hub, and a low-friction coating or component presented on one side of the wheel. In this embodiment the coating or component reduces friction and wear in the event of contact between the wheel and a guideway curb. In some cases the wheel body may be non-inflatable and the coating may be applied after wheel manufacture. Also in some cases there may be a sidewall modularly installable to the wheel wherein the coating is applied to the sidewall.

In some cases wheel comprises an inflatable tire, and in some cases the coating may be one of a Teflon-based coating, a Teflon-ceramic hybrid coating, or a ceramic-metal hybrid coating. The coating may be applied by spraying.

BRIEF DESCRIPTION OF THE DRAWING FIGURES

FIG. 3 is a top view of a friction reducing safety panel for a guideway curb according to an embodiment of the present invention.

FIG. 4 is a cross-section of the panel of FIG. 3 viewed along section line AA.

DETAILED DESCRIPTION

The inventor provides a system to guide vehicles in a controlled fashion in guideways, with minimum wear and friction between guideways and the vehicle's tires, in systems with vehicles traveling on a mass transit guideway such as described in co-pending application Ser. No. 11/560,981. The system of the invention may also apply to other existing transit systems that involve wheeled vehicles in close proximity to a track or guideway curb without departing from the spirit and scope of the invention. The invention is described in enabling detail below.

Figure 1:
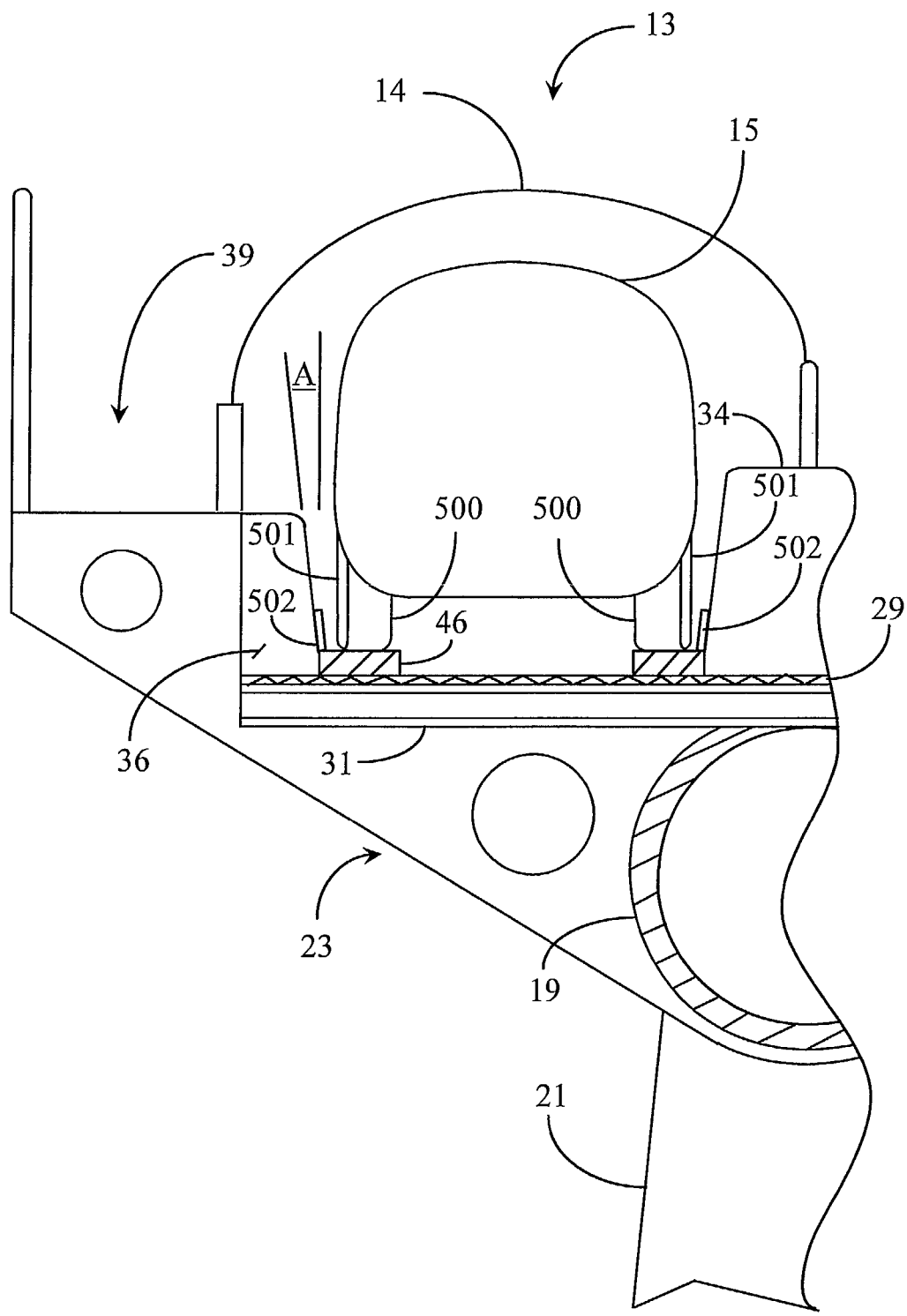
FIG. 1 is a partial cross-section of an elevated guideway of a personal transit system including a friction reducing safety system according to an embodiment of the present invention.

FIG. 1 is a partial cross-section of an elevated guideway construction 23 of a personal transit system including a friction reducing safety system according to an embodiment of the present invention. This example of a mass transit guideway construction is analogous to the example of FIG. 2A of the cross-referenced specification. Some of the elements are the same in both examples and shall retain their same element numbers and descriptions. Some element numbers and elements of FIG. 2A of the co-pending specification are omitted in this example for the purpose of clarity.

In this example, a personal vehicle (PV) 15 is illustrated riding on raised tracks 46. In this example, cross members 23, support tube 19, upright pillar 21 and I beam support member 31 support guideway surface 29 in a fashion such that the guideway is elevated above the ground. In one embodiment, some or all of the architecture may support an on ground guideway as well. Tracks 46 are spaced apart approximately to the width dimensioning of the wheelbase of PV 15 so that the vehicle is constrained to riding on the elevated tracks. System 13 has walkways 39 that also include guideway curbs 34 and 36. Curbs 34 and 36 define the maximum width of the guideway.

In this example, the guideway-facing sides of each curb 34 and 36 are angled slightly outward, as represented by angle A, relative to the width of the guideway defining a relative narrow base width that becomes wider with elevation. The exact angle may be between 3 and 7 degrees, but may be greater than 7 degrees in some embodiments. Tracks 46 are located immediately adjacent to each curb. The minimum width from curb to curb at the top surface tracks 46 is just several inches greater that the overall width of the wheelbase of PV 15. This enables PV 15 to ride on tracks 46 without touching the guideway curbs and also constrained PV 15 to ride on tracks 46. Even with one or more state-of-the-art guidance systems operating to keep vehicle from contacting guideway curbs, it is still possible that contact between the curbs and the PV may occur. The system of the present invention ensures that such contact causes no damage to the guideway curbs or to the personal vehicle. In some cases the system of the invention may be the primary, or even the only guidance system for vehicles. The angling of the curbs is done partly to ensure that contact with vehicle tires will occur only at an outer periphery of the tires.

In this example PV 15 has wheels 500, which may be tires in one embodiment. Wheels 500 are equipped, in this example, with low-friction material sidewalls 501. In one embodiment sidewalls 501 are molded contiguously with each tire or wheel and are coated with Teflon™ to reduce friction. In another embodiment, sidewalls 501 are separate durable parts that may be installed on wheels 500 by epoxy, stitching, or some other method.

In this embodiment, sidewalls 501 may be durable polymers or even metallic parts coated with a ceramic based industrial coating to reduce both friction and heat generation. High temperature and low friction industrial coatings such as Teflon PTFE™ and Teflon FEP™ can be used. In one embodiment ceramic/metal hybrid coatings might be used like Xylan™ 1010 or Xylar™ 2. There are also Teflon/ceramic hybrid coatings available. Such coatings use Teflon for low friction and ceramic for abrasion and wear resistance. Many of these industrial coatings also have Ultraviolet Light (UV) resistant properties and salt resistant properties, which may be important depending on the geographic location of the personal transit guideway. Such coatings are available to the inventor from industrial sources like Coating Solutions Inc located in Saint Paul Minn. www.coatingsolutions.com.

The coatings described above may have some differences in how they are best applied, what temperatures are used to cure them, and how many layers are required to successfully coat a product. In the case of high temperature curing, sidewalls 501 may be provided as separate parts that would be installed to wheels after they are coated.

The guideway in this example is fitted with low-friction side curbs 502 running the length of the guideway. Side curbs 502 are strategically located at the top surface of tracks 46 and extend in height up the surface of the adjacent curb to which the curb is installed. The height of curb 502 is sufficient to engage sidewalls 501 at the bottom half of the wheel. Curbs 502, when installed on curbs 34 and 36, conform to the angle of the curb surface so that they are angled out slightly from the substantially vertical profile of the sidewall further reducing the possible area of surface contact between the sidewalls and the curbs should contact occur.

Sidewalls 501 may be manufactured of a durable metal, fiberglass, or polymer that is treated or coated with a low friction, abrasion and wear-resistant, industrial coating such as one of those coatings previously described above. Provision of sidewalls 501 and curbs 502 enables incidental contact between PV 15 and either curbs 36 or 34 without generating frictional heat or causing any excessive wear or abrasion to wheels or curb walls. Moreover, provision of modular parts enables timely maintenance where curbs 502 and sidewalls 501 may be periodically inspected and if needed re-coated or replaced with new parts.

Figure 2:
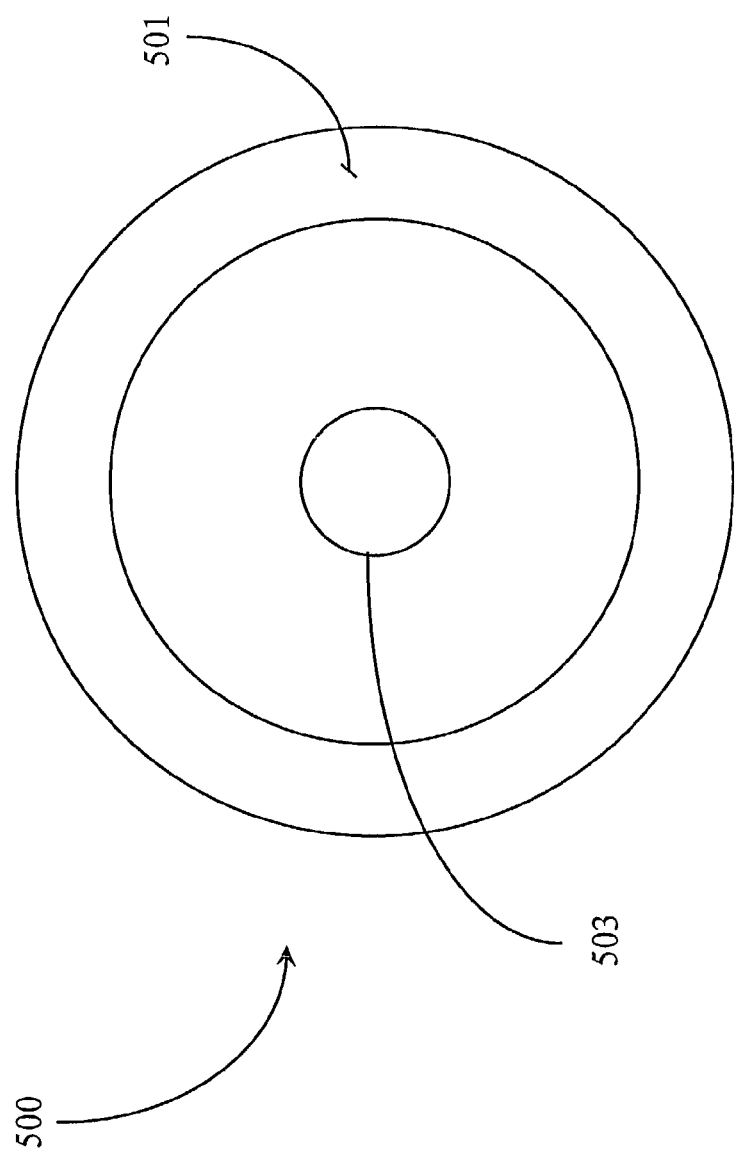
FIG. 2 is an elevation view of a tire of a personal vehicle including a friction reducing sidewall according to an embodiment of the present invention.

FIG. 2 is an elevation view of a PV wheel 500 with sidewall 501 installed according to an embodiment of the present invention. Wheel 500 includes a wheel hub 503. Sidewall 501 has a special low friction coating of any of the types described above. Sidewall 501 may be formed with wheel 500 in one embodiment. For example, wheel 500 may be an inflatable tire manufactured with sidewall 501 and wherein coating of sidewall 501 may occur after manufacture. In this embodiment, sidewall 501 may simply comprise the coating and otherwise is of the same underlying rubber composite material as the tire.

In one embodiment, sidewall 501 is a separate piece that is first coated and then installed to tire or wheel 500. In this embodiment, sidewall 501 may be manufactured of a durable hard material that is coated. The sidewall may be installed to the wheel or tire by epoxy or may be molded in with the tire during manufacture of the tire. Other methods of installing sidewall 501 to tire 500 may be provided without departing from the spirit and scope of the present invention. Stitching, gluing, and molding are just some possible methods. In the case of a durable polymer wheel, sidewall 501 may be manufactured separately from the rest of the wheel and may be installed to the wheel by press fit, bolt on, or snap-on method. There are many possibilities.

FIG. 3 is a top view of curb 502 according to an embodiment of the present invention. Curb 502 may be manufactured of a durable but flexible material such as a high temperature polymer or of a sheet metal base sheet of some predicable length. Some flexibility is required for conforming to possible curves in the guideway curb it is installed to. The base sheet, illustrated later in FIG. 4 as base sheet 504 may be one contiguous material or two or more sheets laminated together to form a desired thickness. In this example, curb 502 has opposing installation flanges 506 formed thereon with a plurality installation bolt openings 507 provided through the flanges in a linear pattern along the length of the curb. Curb 502 is coated on the top surface, which in this example is elevated above the flanges.

In order to provide a continuous installation of curbs along the length of a guideway, the ends of each curb may have tongue and groove connections similar to some wood floor products so that they may be installed together without producing a gap between them. In this example, a groove 509 and a tongue 508 are illustrated but are considered optional features as other methods for ensuring flush end-to-end installation are possible. Additionally, the thickness dimension of each curb may be tightly controlled to eliminate steps along the installation. In some cases, portions of the guideway curb may be surfaced at the location where curbs meet to help ensure a smooth surface transition between curbs. Further, due to differences in expansion coefficients between different portions of the roadway, expansion joints may be provided.

FIG. 4 is a cross-section of curb 502 of FIG. 3 taken along the section line AA. Curb 502 includes base sheet 504, flange 506 and industrial top coating 505. Base sheet 504 may be provided in the form of a single polymer or metallic sheet or of more than one layer laminated together. Some flexibility is desired so that the curb may conform to natural curves in the guideway. Optional tongue and groove features 508 and 509 described above in FIG. 3 are visible in this example.

Among the coating properties available in the coatings described further above, is a non-combustion property that may be desired in addition to low friction and wear or abrasion resistance properties. The coatings that enable the system are available to the inventor as described above. The exact coating selected for application may depend in part of the average speed of personal vehicles traveling on the guideway and on the geographic region of the guideway. For example, if the guideway is in an area that gets an abundance of snow for example, a corrosion resistance property would be included in the coating selected in addition to the more static properties of low friction and wear resistance. In areas where there is an abundance of sun and heat a UV resistance property would be included in the coating selected in addition to the static properties of low friction and wear resistance.

It will be apparent to one with skill in the art that the low friction safety system of the invention may be provided using some or all of the mentioned features and components without departing from the spirit and scope of the present invention. For example, in one embodiment only the coated sidewalls of the invention are used to reduce friction and wear against a guideway curb otherwise not coated. In another embodiment, only the curbs may be provided to reduce friction and wear against the wheels of a PV. Also in some embodiments low-friction coatings may be sprayed on, either on side curbs or tires, or both. In the case of spray-on coatings on tires of a vehicle, a station near an entrance to a guideway may be enabled to ascertain a time period since a last spray-on coating was applied for a certain vehicle, and the spray may be applied only if the ascertained time period is longer than a pre-set threshold. In some embodiments the guiding system described above may be the primary guidance system for the guideway, in other cases the computerized system may be the sole guiding system, and in some cases both may be used. In still another variation to the embodiments described above, low-friction studs or rods may be molded into a vehicle's tires in manufacture, such that the studs or rods will contact the curbs. Also in some cases no anti-friction material may be needed.

It will also be apparent to the skilled artisan that the embodiments described above are exemplary of inventions that may have far greater scope than any of the singular descriptions. There may be many alterations made in the descriptions without departing from the spirit and scope of the present invention. The spirit and scope of the invention is limited only by the following claims.

What is claimed is:

1. A guideway system comprising:

a wheeled vehicle having a pair of front wheels with a span dimension across the outside of each wheel of the pair;

a substantially horizontal track providing a guideway having a width for guiding and supporting the wheeled vehicle in motion;

a first assembly of guide curbs placed on the track end-to-end along the track in the direction of vehicle motion, individual guide curbs of the first assembly comprising a sidewall for guiding a first wheel of the pair on one side of the wheeled vehicle; and a second assembly of guide curbs placed on the track end-to-end along the track in the direction of the vehicle motion, individual guide curbs of the second assembly comprising a sidewall for guiding a second wheel of the pair on a side opposite the vehicle from the first wheel; wherein the sidewalls of curbs in the first and second assembly face inwardly toward one another, are spaced apart at a dimension marginally greater than the span dimension across the front wheels of the vehicle, are angled slightly outward relative to the width of the track defining a relative narrow base track width, and the sidewalls meet the track at the angle rather than perpendicularly, and wherein one or both of the sidewalls of the curbs and the sides of the wheels facing the curbs comprise a surface conditioned to reduce friction between the curb sidewalls and the sides of the wheels.

\* \* \* \* \*